(12) United States Patent
Carmichael (10) Patent No.: US 6,948,281 B1
(45) Date of Patent: Sep. 27, 2005

(54) STORM SHELTER

(76) Inventor: Bruce Carmichael, 750 W. Madison, Lebanon, MO (US) 65536

( * ) Notice: Subject to any disclaimer, the term of this patent is extended or adjusted under 35 U.S.C. 154(b) by 0 days.

(21) Appl. No.: 10/920,329

(22) Filed: Aug. 18, 2004

(51) Int. Cl.[7] .............................................. F02D 29/00
(52) U.S. Cl. ............................ 52/86; 52/88; 52/169.6; 52/745.07; 52/745.06
(58) Field of Search ............................. 52/88, 86, 79.4, 52/79.5, 79.12, 169.6, 745.07, 745.08; 49/394, 49/395, 70

(56) References Cited

U.S. PATENT DOCUMENTS

| 970,873 | A | * | 9/1910 | Bear ........................... 119/482 |
| 2,883,979 | A | * | 4/1959 | Hunter et al. ............. 126/90 R |
| 3,629,982 | A | * | 12/1971 | Ballay et al. ................... 52/69 |
| 3,749,107 | A | * | 7/1973 | Laberge ...................... 135/137 |
| 4,184,538 | A | * | 1/1980 | Rauenhorst .................. 165/66 |
| 4,930,819 | A | * | 6/1990 | Sharp et al. ................... 292/42 |
| 5,252,002 | A | * | 10/1993 | Day ............................ 405/126 |
| 5,333,421 | A | | 8/1994 | McKenna |
| 5,481,837 | A | | 1/1996 | Minks, Jr. |
| 5,611,178 | A | * | 3/1997 | Aubert ....................... 52/169.6 |
| 5,930,961 | A | | 8/1999 | Beaudet |
| 6,085,475 | A | | 7/2000 | Parks et al. |
| 6,131,343 | A | | 10/2000 | Jackson, Jr. |
| 6,151,841 | A | | 11/2000 | Green |
| 6,161,345 | A | * | 12/2000 | Hope et al. ................. 52/169.6 |
| 6,408,796 | B1 | * | 6/2002 | Hampel ....................... 119/498 |
| 6,550,189 | B2 | | 4/2003 | Shelton |
| 6,679,009 | B2 | | 1/2004 | Hotes |
| 2003/0126805 | A1 | | 7/2003 | Roberts |

* cited by examiner

Primary Examiner—Carl D. Friedman
Assistant Examiner—Chi Q. Nguyen
(74) Attorney, Agent, or Firm—Richard C. Litman (57) ABSTRACT

The storm shelter is a portable above ground shelter that is aerodynamically stable and can be dimensioned to fit under a standard sized mobile home. The shelter provides an enclosure formed by an arch shaped rigid sheet that is permanently attached to a rectangular shaped base member. Hinged doors are provided on each end of the shelter for rapid and easy entrance and exit. Each door is provided with a failsafe snap locking mechanism and contains a louvered conduit for ventilation and air pressure equalization. The louvered conduits are protected from wind damage by covers attached to the exterior surface of each door. Further safety is provided through the use of tie cables that are strung tightly from one side to the other side over the top of the shelter and secured into the ground using tie rods and earth anchors.

15 Claims, 8 Drawing Sheets

STORM SHELTER

BACKGROUND OF THE INVENTION

1. Field of the Invention

The present invention relates to shelters, and more specifically, to a portable aboveground storm shelter to be used or occupied during severe weather conditions.

2. Description of the Related Art

Shelters are commonly used as a means for safety and protection against extreme weather conditions, including hurricanes and tornados. There is a need for an above ground storm shelter that is versatile and easy to use. It is desirable that the storm shelter be portable, be strong and aerodynamically stable enough to withstand strong weather conditions, provide easy and fast access, anchor into the ground with little or no excavation, and be large enough to hold an entire family, yet still be capable of fitting beneath a mobile home.

U.S. Pat. No. 5,481,837, issued Jan. 8, 1996 to Minks, Jr., describes a storm shelter for use with a mobile home. The storm shelter is juxtaposed to the mobile home beneath the entrance and has a sidewall that extends into and is anchored into the ground. U.S. Pat. No. 5,930,961, issued Aug. 3, 1999 to Beaudet, describes a site assembled emergency shelter. The shelter can be constructed in a large variety of shapes and sizes for different uses. Different structural materials can be selected for appearance, endurance, weight, strength, cost and other factors and installation components such as ground anchors, air circulators, and accesses can be provided.

U.S. Pat. No. 6,085,475, issued Jul. 11, 2000 to Parks et al., describes a portable severe weather storm shelter. The shelter includes a thin plastic tank surrounded by a horizontal frame that includes anchor legs and the shell and frame are covered with a protective layer. The shelter further includes two ventilation conduits, a window, and an access door. U.S. Pat. No. 6,131,343, issued Oct. 17, 2000 to Jackson, Jr., describes an apparatus and method for storm shelter. The storm shelter can be used above ground or below ground and can be made from a single sheet of curved material and a base frame that is anchored to a foundation. The shelter may be constructed of corrugated metal sheeting.

U.S. Pat. No. 6,151,841, issued Nov. 28, 2000 to Green, describes a prefabricated portable tornado shelter. The shelter is assembled to form a square-pyramid shaped enclosure with latched doors and windows. The shelter allows constant air pressure equalization between its interior and exterior and is held firmly to the ground with four auger bolts. U.S. Pat. No. 6,550,189, issued Apr. 22, 2003 to Shelton, describes a weather shelter. The shelter is constructed from a dome member that fits completely over a base member and is secured into the ground with a series of tie cables and rods.

U.S. Pat. No. 6,679,009, issued Jan. 20, 2004 to Hotes, describes a compact, all-weather temporary shelter. The shelter includes a plurality of lightweight structural arched frame supports that connect to a lightweight, rectangular-shaped base frame that can be secured into the ground. U.S. patent Publication No. 2003/0126805, published Jul. 10, 2003 and applied for by Roberts, describes a tornado or hurricane shelter. The shelter is located above ground and is intended to provide a place of safety for up to ten people. The structure has an oblong shape and has high strength wires attached over the top and anchored into the ground for added support.

Another patent showing a shelter-type unit is U.S. Pat. No. 5,333,421, issued Aug. 2, 1994 to McKenna (housing unit).

None of the above inventions and patents, taken either singly or in combination, is seen to describe the instant invention as claimed. Thus a storm shelter solving the aforementioned problems is desired.

SUMMARY OF THE INVENTION

The storm shelter of the present invention provides a safe, convenient, and versatile means for protecting the users against the dangers of severe weather, including tornados and hurricanes. The shelter has an enclosure that is defined by an arched outer body and a pair of identical doors. The outer body is comprised of a single rigid arched sheet of material that is permanently attached to a rigid rectangular shaped base. The base has a pair of upstanding flanges running along two sides that are provided for attaching the arched member using bolts, screws, rivets, or some other type of attaching means. The enclosure is completed by a pair of identical doors, one each located at the end of the arched outer body.

Each door is hinged to the base of the shelter and can swing out into an open position for access to the interior of the shelter. Each door has a louvered vent displaced through it that is adjustable between an open and closed position. Each adjustable louvered vent allows the user to control the airflow into the interior of the shelter and provides a means for equalizing the air pressure on the exterior and interior of the shelter. Each louvered vent is protected from wind damage by a protective covering that is attached to the exterior of each door over each vent. Each door further contains an interior and exterior handle for easy opening and closing.

When in the closed position, each door is secured into place through the use of a locking mechanism. The locking mechanism consists of a series of slam lock type latches, and corresponding catches, that are controlled by a series of release cables connected to a single pull ring located along the interior surface of each door. The latches can be released from inside the shelter by pulling on the pull ring. In order to release the latches from outside of the shelter, a pull cord is attached to each pull ring and threaded through a small aperture near the bottom of each door. The pull cord is exposed along the exterior of each door and can be pulled from the exterior of the shelter to unlock the door and gain access.

Further safety is ensured through the use of tie cables that are strung tightly from one side to the other side over the top of the shelter and secured into the ground using tie rods and earth anchors. This helps to keep the shelter secured to the ground by preventing strong winds from lifting the shelter into the air.

The shelter can accommodate a family of up to seven people, including two adults and five children, laying inside the shelter in either a prone or supine position. The shelter is constructed so that it is portable and may be dimensioned so that it can fit beneath a standard sized mobile home. The shelter can be anchored into the ground without the need for any major excavation or ground preparation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a storm shelter, designated generally as 10 in the drawings.

Figure 1:
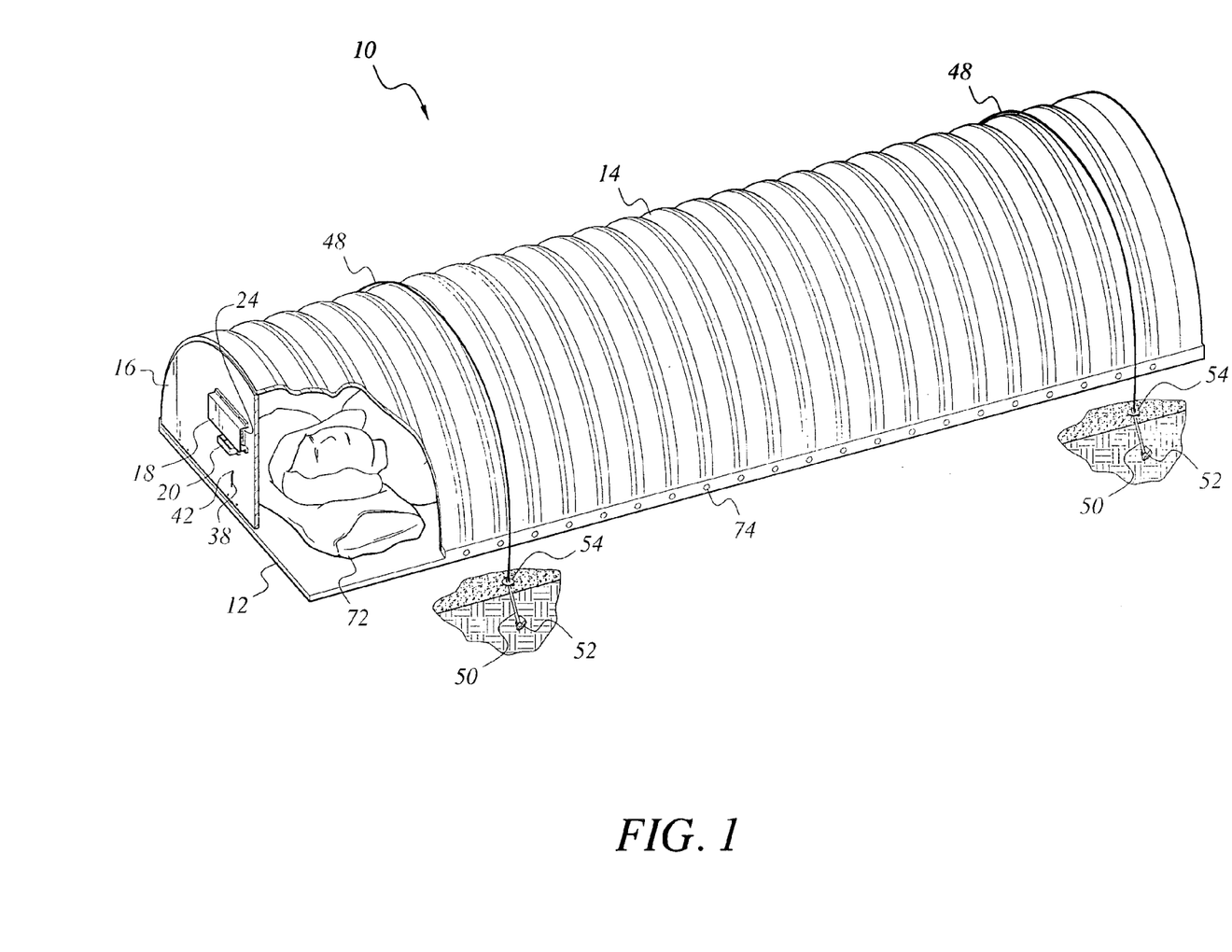
FIG. 1 is an environmental, perspective view showing a storm shelter according to the present invention.
Figure 2:
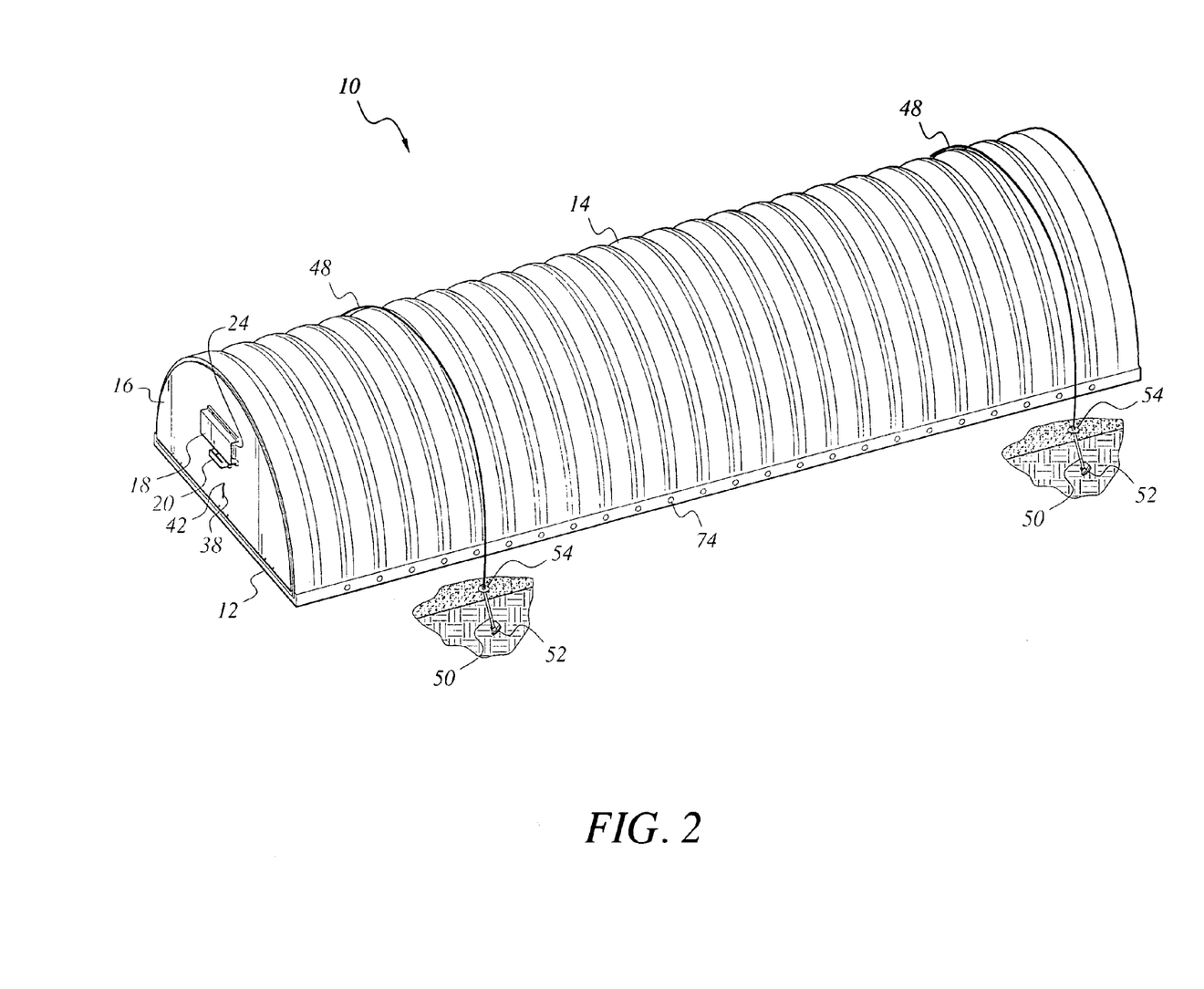
FIG. 2 is a perspective view showing a storm shelter according to the present invention.
Figure 3:
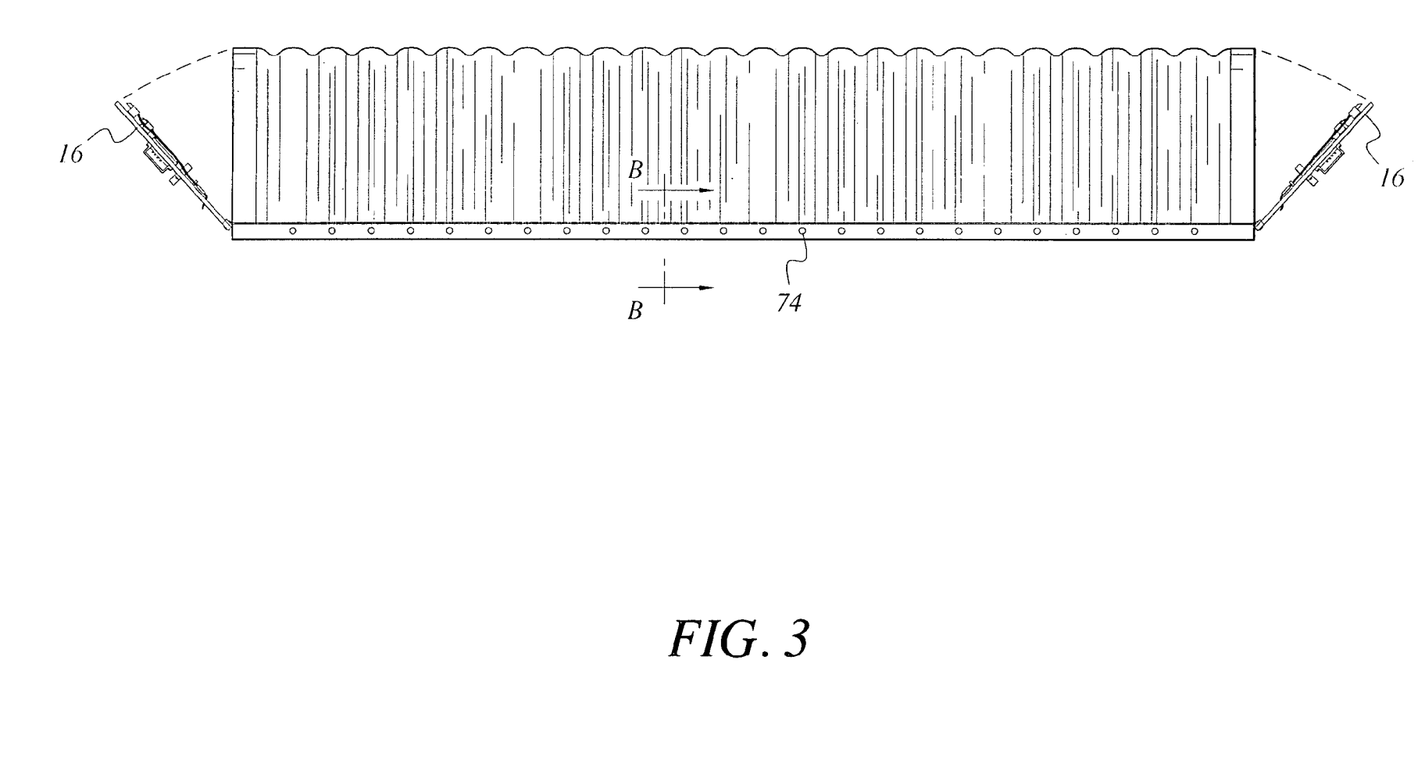
FIG. 3 is a side view showing the storm shelter with both doors in a partially open position according to the present invention.

Referring to FIG. 1, FIG. 2, and FIG. 3 of the drawings, the storm shelter 10 has an enclosure 72 defined by rigid arch shaped sheet member 14, base member 12, and two doors 16. Rigid arch shaped sheet member 14 is secured to base member 12 with a series of bolts 74. In the preferred embodiment, the storm shelter has a pair of tie cables 48 stretched over the top surface of rigid arch shaped sheet member 14. Tie cables 48 are attached to tie rods 50 at the flared upper ends 54 of tie rods 50 and tie rods 50 are secured underground using earth anchors 52. Tie cables 48, tie rods 50, and earth anchors 52 help to keep storm shelter 10 anchored to the ground and prevent wind from lifting storm shelter 10 up into the air. In the preferred embodiment of storm shelter 10, doors 16 each have a louvered vent 24, a vent protection cover 18, an exterior handle 20, and an aperture 42. Louvered vent 24 can be adjusted between an open and closed position and provide ventilation for enclosure 72, as well as providing a way to equalize the air pressure inside and outside storm shelter 10. Vent protection cover 18 is attached to the exterior of door 16 and prevents louvered vent 24 from being damaged by wind while still allowing air to flow through louvered vent 24. Pull cord 38 is threaded from the interior surface of door 16 to the exterior surface through aperture 42. Pull cord 38 allows a user to unlock door 16 from a position outside of the shelter. Exterior handle 20 allows a user to pull door 16 open once it has been unlocked.

Figure 4:
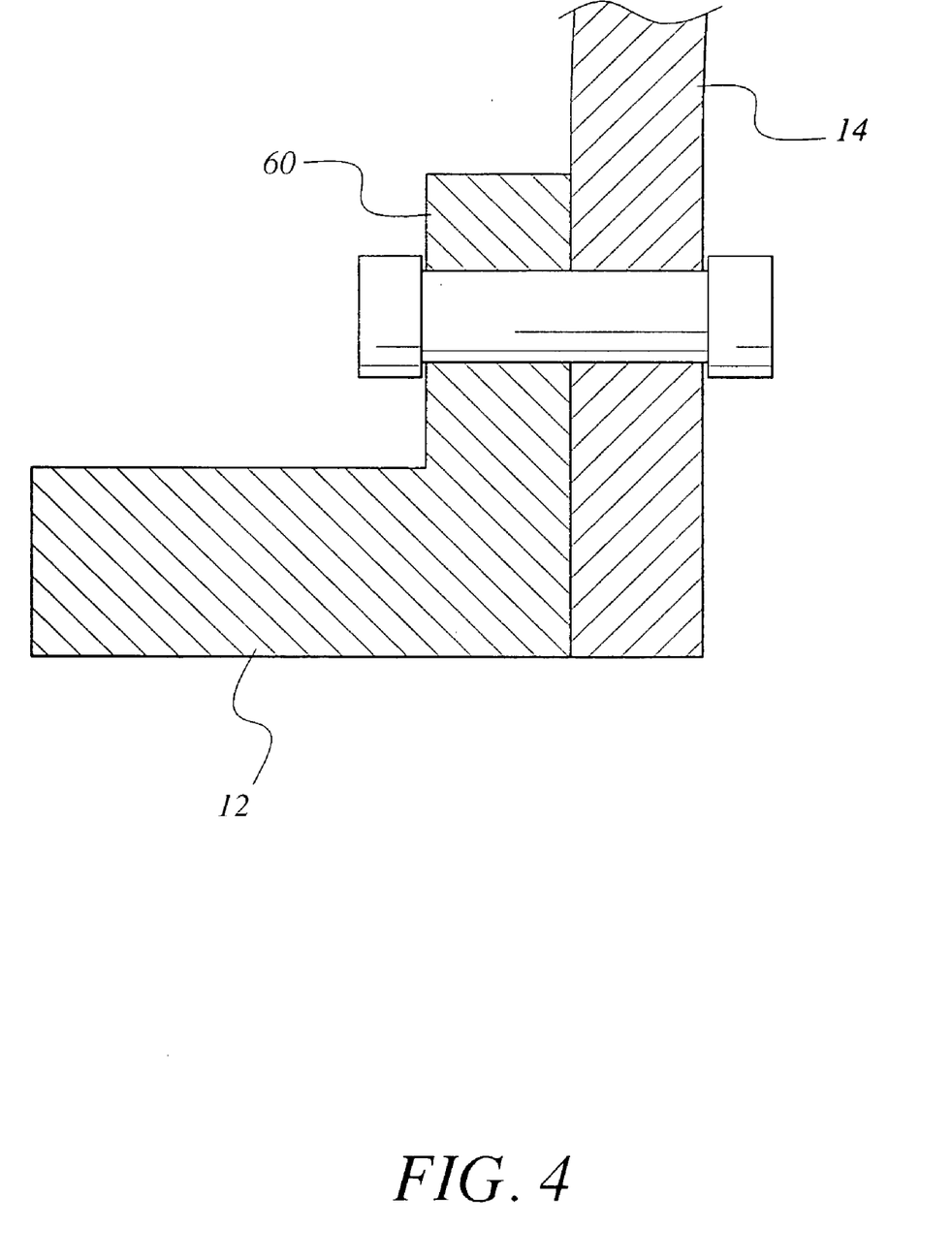
FIG. 4 is a partially cut away cross-sectional view taken along lines B—B of FIG. 3.

As shown in FIG. 4, rigid arch shaped sheet member 14 is secured to base member 12 along flanges 60 of base member 12 using nut and bolt combination 74.

Figure 5:
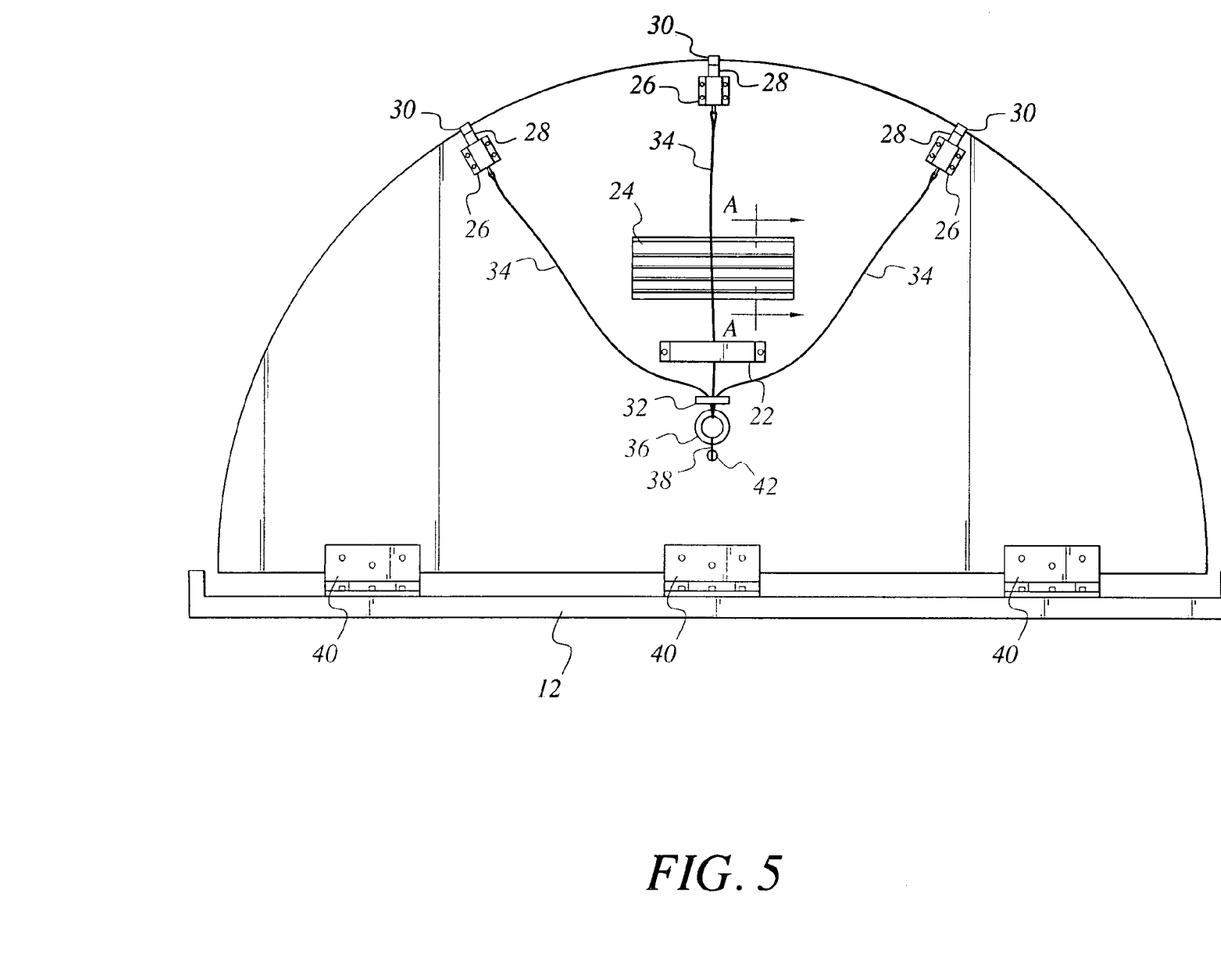
FIG. 5 is an interior view showing a storm shelter door according to the present invention.
Figure 6:
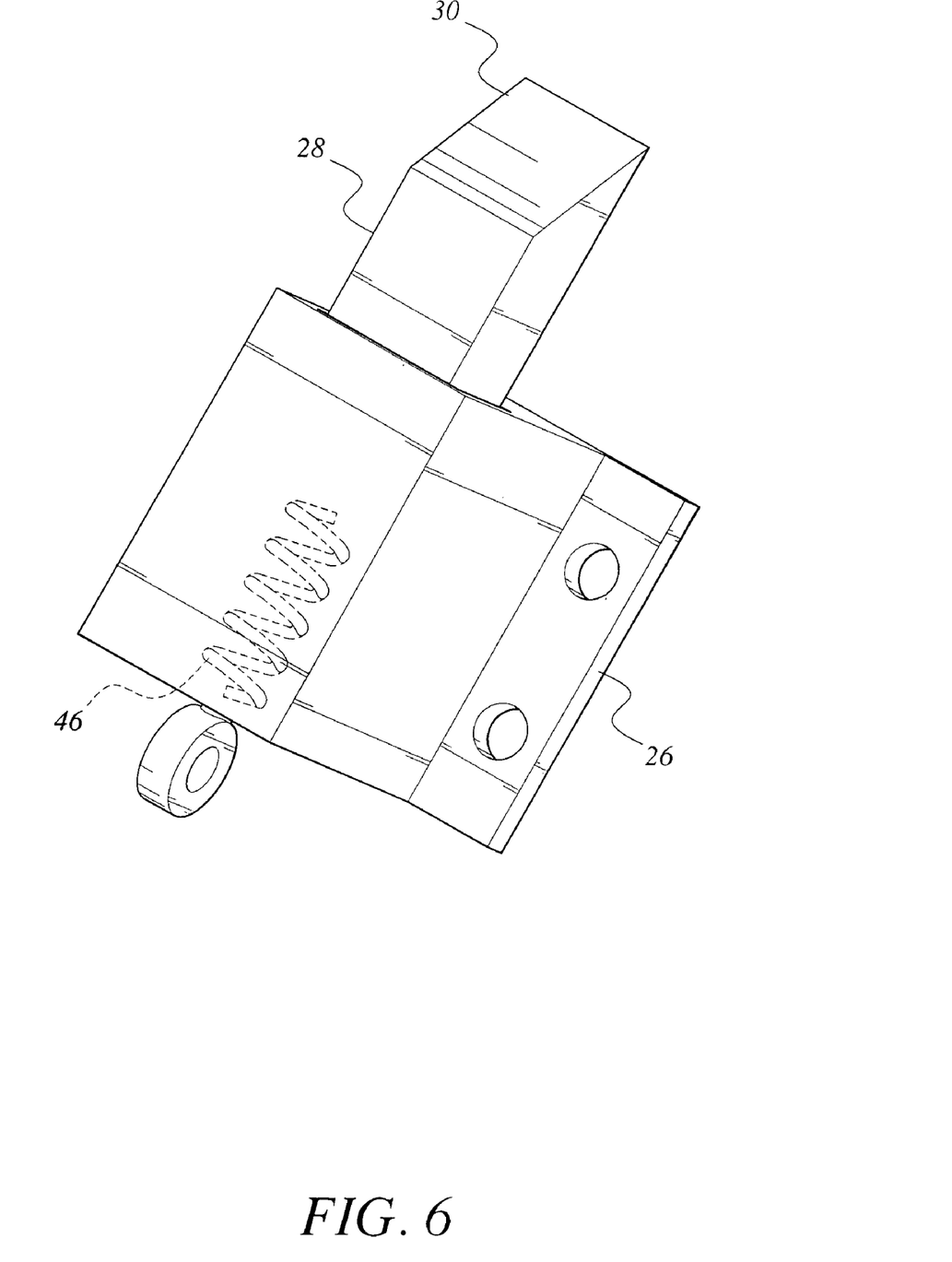
FIG. 6 is a perspective view showing a latch bar channel in conjunction with a latch bar and spring according to the present invention.
Figure 7:
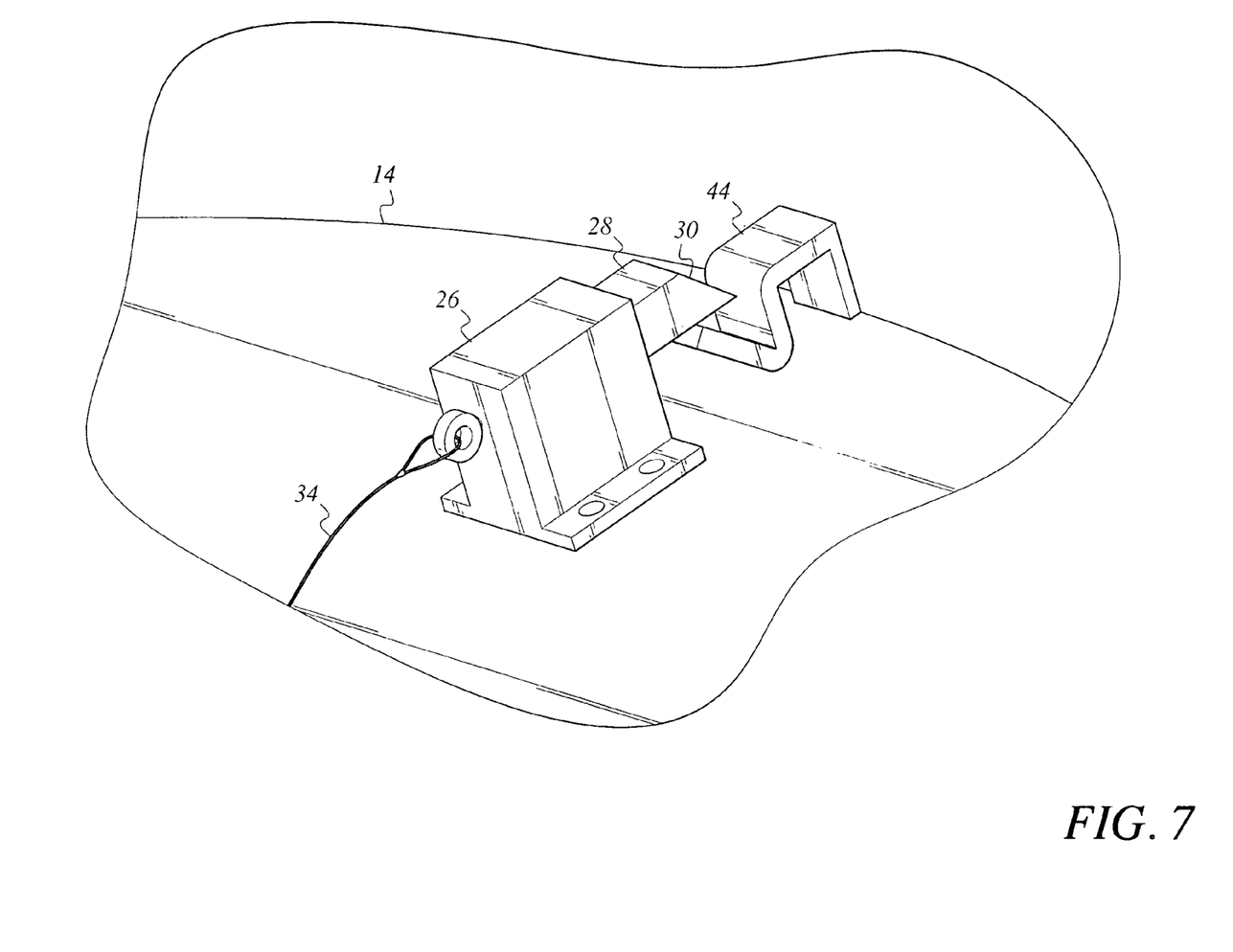
FIG. 7 is an enlarged partially cut away perspective view showing a latch bar with leading beveled edge engaging a catch according to the present invention.

Turning now to FIG. 5, FIG. 6, and FIG. 7, door 16 is hinged along the bottom edge of its interior surface to base member 12 using hinges 40. In the preferred embodiment, the locking mechanism for door 16 includes a plurality of latching devices, pull ring 36, and pull cord 38. Each latching device has a latch bar channel 26, a latch bar 28, a spring 46, and a catch 44. Latch bar channel 26 is attached to the interior surface of door 16 along its curved edge and corresponds to catch 44 that is attached to the interior surface of rigid arch shaped member 14 along its edge. Latch bar 28 is mounted in latch bar channel 26 and can travel through latch bar channel 26 in a linear fashion. Spring 46 is inside latch bar channel 26 and engages latch bar 28 and forces latch bar into a position over catch 44. When door 16 is in the closed position, leading beveled edge 30 of latch bar 28 passes over catch 44 and latch bar 28 is locked into place. Release cable 34 is attached to spring 46 at the opposite end of latch bar 28 and can be pulled in a downward manner for releasing latch bar 28 from catch. Release cables 34 are all tied to a single pull ring 36. Pull ring 36 can be pulled in a downward manner in order to pull release cables 34 simultaneously and unlock door 16 from a position inside of storm shelter 10. Pull ring 36 is maintained in a constant position relative to door 16 by retainer clip 32 attached to the interior surface of door 16. Pull cord 38 is tied to pull ring 36 and aperture 42 allows pull cord 38 to be exposed to the exterior of storm shelter 10 for access. Interior handle 22 is attached to the interior surface of door 16 and allows a user who is positioned inside storm shelter 10 to pull door 16 from an open position to a fully closed position.

Figure 8:
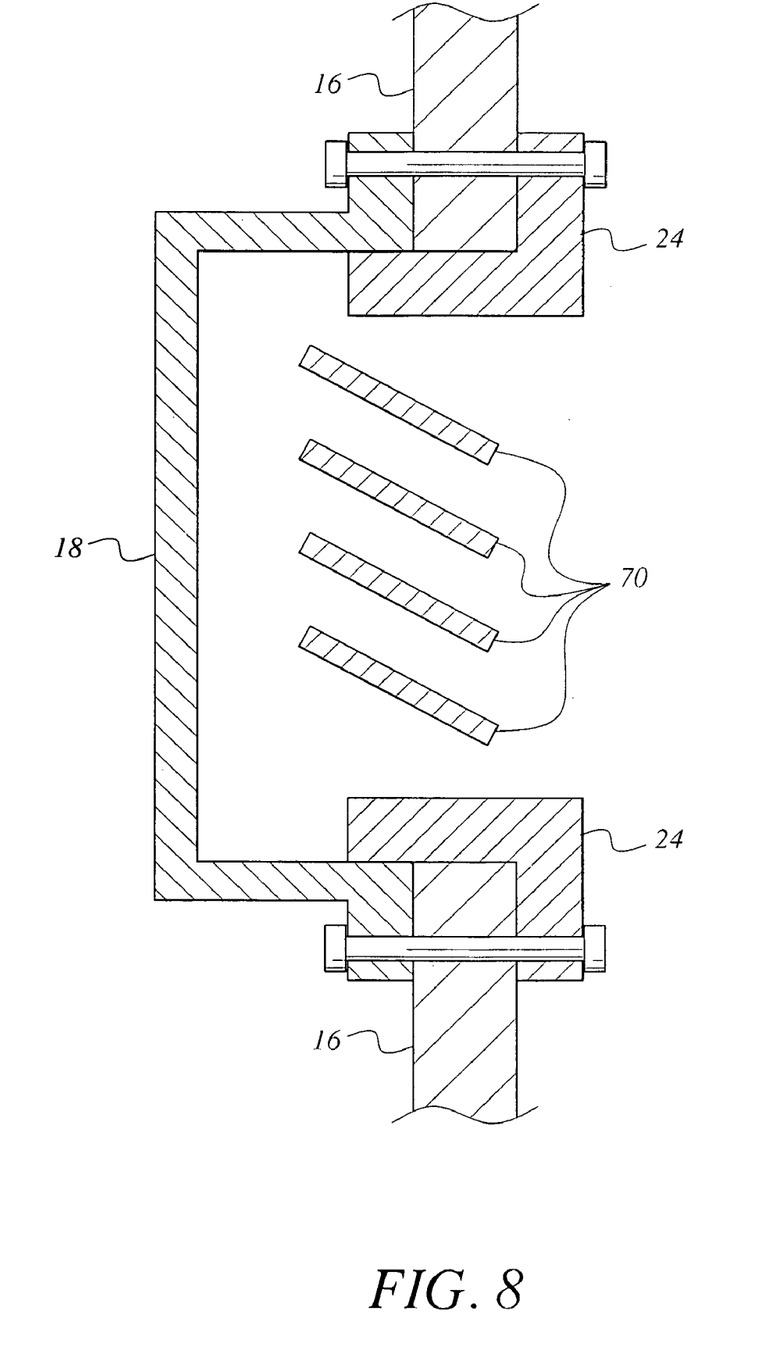
FIG. 8 is a partially cut away cross-sectional view taken along lines A—A of FIG. 5.

As shown in FIG. 8, louvered vent 24 having slats 70 is displaced through door 16. Vent protection cover 18 is attached to the exterior surface of door 16 and protects louvered vent 24 from damage.

It is to be understood that the present invention is not limited to the embodiments described above, but encompasses any and all embodiments within the scope of the following claims.

I claim:

1. A storm shelter, comprising:
a rectangular-shaped base member having a first end and second end and two sides, a thickness, and an upstanding flange along the length of each of the two sides;
an enclosure defined by a top surface, a first end surface, a second end surface, and a first and second side surfaces;
a rigid arch-shaped sheet member forming the top surface and the first and the second side surfaces of the storm shelter, the sheet member being fit over the base member such that the inner surface of the sheet member is proximal to the upstanding flange along the length of each of the two sides of the base member, the sheet member being permanently connected to the base member along the length of each upstanding flange;
a first door forming the first end surface of the storm shelter, the first door being pivotally attached to the base member along the first end of the base member for providing a first access to the storm shelter, the first door having an upper aperture and a lower aperture therethrough;
a second door forming the second end surface of the storm shelter, the second door being hingedly attached to the base member along the second end of the base member for providing a second access to the storm shelter, the second door having and upper aperture and lower aperture therethrough;
a first louvered conduit disposed in and through the upper aperture in the first door; and
a second louvered conduit disposed in and through the upper aperture in the second door.

2. The storm shelter according to claim 1, further comprising a locking mechanism for the first door, the locking mechanism comprising:
a plurality of catches installed on the inner surface of the sheet member adjacent the first access, each catch being a single piece rigid element having a fixed position in relation to the first access and having a sloped face toward the enclosure;

a plurality of latch bar channels mounted to the interior surface of the first door along the peripheral edge of the first door;

a plurality of latch bars, each latch bar being mounted in a latch bar channel for linear travel therethrough to releasably engage a catch, each latch bar being positioned by the latch bar channel to impinge on the catch as the door is closed and having a leading beveled edge along an exposed end of the latch bar for riding over the sloped face of the catch as the first door is closed on the first access;

a plurality of springs, each spring being in a latch bar channel engaging the latch bar to bias the latch bar against the sloped face with the latch bar assuming an engaged position with the catch when the first door is in the closed position;

a plurality of release cables, each release cable being attached to a spring at one end to retract the latch bar to the released position relative to the catch;

a pull ring attached to the opposite end of each release cable and positioned at a location substantially beneath the latch bars and catches but within the enclosure of the storm shelter;

a retainer clip permanently attached to the interior surface of the first door, the retainer clip holding the pull ring in a fixed position beneath the retainer clip when the first door is in the closed position; and a pull cord attached to the pull ring, the pull cord extending through the lower aperture in the first door for pulling the cables and retracting the latch bars to the released position from outside of the storm shelter.

3. The storm shelter according to claim 1, further comprising a locking mechanism for the second door, the locking mechanism comprising:

a plurality of catches installed on the inner surface of the sheet member adjacent the second access, each catch being a single piece rigid element having a fixed position in relation to the second access and having a sloped face toward the enclosure;

a plurality of latch bar channels mounted to the interior surface of the second door along the peripheral edge of the second door;

a plurality of latch bars, each latch bar being mounted in a latch bar channel for linear travel therethrough to releasably engage a catch, each latch bar being positioned by the latch bar channel to impinge on the catch as the door is closed and having a leading beveled edge along an exposed end of the latch bar for riding over the sloped face of the catch as the second door is closed on the second access;

a plurality of springs, each spring being in a latch bar channel engaging the latch bar to bias the latch bar against the sloped face with the latch bar assuming an engaged position with the catch when the second door is in the closed position;

a plurality of release cables, each release cable being attached to a spring at one end to retract the latch bar to the released position relative to the catch;

a pull ring attached to the opposite end of each release cable and positioned at a location substantially beneath the latch bars and catches but within the enclosure of the storm shelter;

a retainer clip permanently attached to the interior surface of the second door, the retainer clip holding the pull ring in a fixed position beneath the retainer clip when the second door is in the closed position; and a pull cord attached to the pull ring, the pull cord extending through the lower aperture in the second door for pulling the cables and retracting the latch bars to the released position from outside of the storm shelter.

4. The storm shelter according to claim 1, further comprising:

a plurality of anchor rods located substantially near the first and second side surfaces of the storm shelter, each anchor rod having a flared upper end and a lower end, wherein each anchor rod is vertically oriented in the ground such that a substantial portion of each rod is underground;

a plurality of earth anchors, each earth anchor being connected to the lower end of an anchor rod, wherein each earth anchor prevents the anchor rod from being pulled out of the ground; and a plurality of tie cables, each tie cable having two ends, wherein one end of each tie cable is attached to the flared upper end of an anchor rod located near the first side surface of the storm shelter and the other end of the tie cable is attached to the flared upper end of an anchor rod located near the second side surface of the storm shelter, the tie cable being tightly secured over the top surface of the storm shelter for anchoring the storm shelter to the ground.

5. The storm shelter according to claim 1, wherein the first louvered conduit is a louvered vent, the louvered vent being adjustable between an open position and a closed position, wherein the louvered vent is provided to equalize air pressure between the atmosphere outside of the storm shelter and the atmosphere inside the storm shelter.

6. The storm shelter according to claim 1, wherein the second louvered conduit is a louvered vent, the louvered vent being adjustable between an open position and a closed position, wherein the louvered vent is provided to equalize air pressure between the atmosphere outside of the storm shelter and the atmosphere inside the storm shelter.

7. The storm shelter according to claim 1, further comprising a first protective cover, the first protective cover being attached to the exterior surface of the first door over the first louvered conduit for protecting the first louvered conduit against wind damage.

8. The storm shelter according to claim 1, further comprising a second protective cover, the second protective cover being attached to the exterior surface of the second door over the second louvered conduit for protecting the second louvered conduit against wind damage.

9. The storm shelter according to claim 1, wherein the sheet member is permanently connected to the base member along the length of each upstanding flange through the use of bolts through holes in the sheet member aligned with horizontal holes through the length of each upstanding flange.

10. The storm shelter according to claim 1, further comprising a handle attached to the exterior surface of the first door.

11. The storm shelter according to claim 1, further comprising a handle attached to the exterior surface of the second door.

12. The storm shelter according to claim 1, further comprising a handle attached to the interior surface of the first door.

13. The storm shelter according to claim 1, further comprising a handle attached to the interior surface of the second door.

14. The storm shelter according to claim 1, wherein the base member is constructed of steel.

15. The storm shelter according to claim 1, wherein the sheet member is constructed of corrugated steel.

* * * * *